United States Patent
Furtwängler et al.

(10) Patent No.: US 9,187,103 B2
(45) Date of Patent: Nov. 17, 2015

(54) METHOD AND DEVICE FOR ESTIMATING THE TEMPERATURE OF AN AXLE BEARING OF A WHEELSET OF A RAIL VEHICLE

(75) Inventors: Ralf Furtwängler, Munich (DE); Ulf Friesen, Neubiberg (DE)

(73) Assignee: KNORR-BREMSE SYSTEME FUR SCHIENENFAHRZEUGE GMBH, Munich (DE)

( * ) Notice: Subject to any disclaimer, the term of this patent is extended or adjusted under 35 U.S.C. 154(b) by 831 days.

(21) Appl. No.: 13/394,955

(22) PCT Filed: Sep. 9, 2010

(86) PCT No.: PCT/EP2010/063206
§ 371 (c)(1),
(2), (4) Date: Apr. 18, 2012

(87) PCT Pub. No.: WO2011/029859
PCT Pub. Date: Mar. 17, 2011

(65) Prior Publication Data
US 2012/0193484 A1 Aug. 2, 2012

(30) Foreign Application Priority Data
Sep. 9, 2009 (DE) .................. 10 2009 040 801

(51) Int. Cl.
*G01K 1/00* (2006.01)
*B61K 9/04* (2006.01)
(Continued)

(52) U.S. Cl.
CPC ............... *B61K 9/04* (2013.01); *B61L 15/0081* (2013.01); *F16C 19/525* (2013.01); *B60L 2200/26* (2013.01); *B60T 7/126* (2013.01)

(58) Field of Classification Search
None
See application file for complete search history.

(56) References Cited

U.S. PATENT DOCUMENTS

| 4,316,175 A | 2/1982 | Koerber et al. |
| 6,161,962 A | 12/2000 | French et al. |

(Continued)

FOREIGN PATENT DOCUMENTS

| CN | 1230245 A | 9/1999 |
| CN | 10154 | 8/2007 |

(Continued)

OTHER PUBLICATIONS

Notification Concerning Transmittal of International Preliminary Report on Patentability and Written Opinion of the International Search Authority for International Patent Application No. PCT/EP2010/063206, dated Sep. 9, 2010.
(Continued)

*Primary Examiner* — Aditya Bhat
(74) *Attorney, Agent, or Firm* — Barnes & Thornburg LLP

(57) ABSTRACT

A method for estimating the temperature ($T_{B,\,est}$) of a wheel bearing of a wheelset of a rail vehicle by means of a calculation model ($T_{bearing}$estimator). The calculation model ($T_{bearing}$,estimator) estimates the temperature of the axle bearing, according to the speed ($v_{train}$) and the ambient temperature ($T_{amb}$) of the rail vehicle as input variables of the calculation model ($T_{bearing}$ estimator), and the temperature of a component of the wheelset, different from the axle bearing but directly or indirectly connected to the axle bearing in a heat-conducting manner, is measured as the measuring temperature ($T_{meas}$) during operation. The temperature of the component different from the axle bearing is estimated by means of the calculation model ($T_{bearing}$estimator) as the estimated temperature ($T_{meas,est}$). In order to improve the accuracy of the calculation model ($T_{bearing}$estimator) in terms of the estimation of the temperature ($T_{B,est}$) of the axle bearing, the calculation model ($T_{bearing}$estimator) has a corrective element ($K_b$) that is used to continuously, temporarily or cyclically calibrate or adjust it on the basis of a comparison of the measuring temperature ($T_{meas}$) with the estimated temperature ($T_{meas,est}$).

11 Claims, 3 Drawing Sheets

(51) Int. Cl.
*B61L 15/00* (2006.01)
*F16C 19/52* (2006.01)
*B60T 7/12* (2006.01)

(56) References Cited

U.S. PATENT DOCUMENTS

2003/0187605 A1 10/2003 Mathews, Jr. et al.
2008/0156944 A1 7/2008 Aurich et al.
2013/0342362 A1* 12/2013 Martin .................... 340/870.16

FOREIGN PATENT DOCUMENTS

| DE | 102005010118 | 9/2006 |
| DE | 102005015312 | 11/2006 |
| EP | 0276201 A2 | 7/1988 |
| EP | 1197416 A2 | 4/2002 |
| EP | 1365163 A1 | 11/2003 |
| WO | 9711871 A1 | 4/1997 |

OTHER PUBLICATIONS

English Translation of Notification Concerning Transmittal of International Preliminary Report on Patentability and Written Opinion of the International Search Authority for International Patent Application No. PCT/EP2010/063206, dated Sep. 9, 2010.

Search Report for International Patent Application No. PCT/EP2010/063206; Jan. 31, 2011.

* cited by examiner

METHOD AND DEVICE FOR ESTIMATING THE TEMPERATURE OF AN AXLE BEARING OF A WHEELSET OF A RAIL VEHICLE

PRIORITY CLAIM

This patent application is a U.S. National Phase of International Patent Application No. PCT/EP2010/063206, filed 9 Sep. 2010, which claims priority to German Patent Application No. 10 2009 040 801.0, filed 9 Sep. 2009, the disclosures of which are incorporated herein by reference in their entirety.

FIELD

Disclosed embodiments relate to a method and a device for the method for estimating the temperature of a wheel set bearing of a wheel set of a rail vehicle by means of a calculation model as well as uses of the temperature estimated according to the method.

BACKGROUND

In rail vehicle traffic, use is being increasingly made of diagnostic and monitoring systems with which changes in the state of components and assemblies of the rail vehicle are sensed to detect defects in these components and assemblies. In particular, in the case of a wheel set of a rail vehicle, the detection of damage is of particular interest with respect to hot running.

Modern high speed trains travel across borders and, therefore, have to comply with corresponding criteria for ensuring interoperability, for example guideline 96/48/EG. The guideline requires, inter alia, onboard monitoring of the wheel set bearings of the wheel sets of the rail vehicle. To disclose critical operating states such as, for example, hot running of a wheel set bearing, it is necessary, in particular, to monitor the temperature of the wheel set bearings.

EP 1 365 163 A1 discloses a device for monitoring the temperature of a wheel set bearing of a wheel set of a rail vehicle in which a sensor element is arranged directly on a sealing element of the wheel set bearing, i.e. as close as possible to the load zone of the wheel set bearing. However, mounting a temperature sensor directly on the load zone of a wheel set bearing on which the highest temperatures have been empirically found to occur, i.e. in the circumferential direction of the outer bearing ring viewed above, gives rise to a certain amount of expenditure in terms of mechanical connection of the temperature sensor and the cabling thereof and is often structurally difficult to implement for reasons of space, in particular if a plurality of load zones have to be taken into account within a bearing unit, for example in the case of double bearings.

SUMMARY

In contrast with the above, the disclosed embodiments make available a method and a device for estimating the temperature of a wheel set bearing of a wheel set of a rail vehicle by a calculation model which permits sufficiently precise estimation of the temperature of the wheel set bearing with low signal-processing expenditure and without direct mounting of temperature sensors on the particular wheel set bearing.

BRIEF DESCRIPTION OF THE FIGURES

Further measures which develop the disclosed embodiments are illustrated in more detail below together with the description of the disclosed embodiments with reference to the figures. In the drawing.

DETAILED DESCRIPTION

Figure 1:
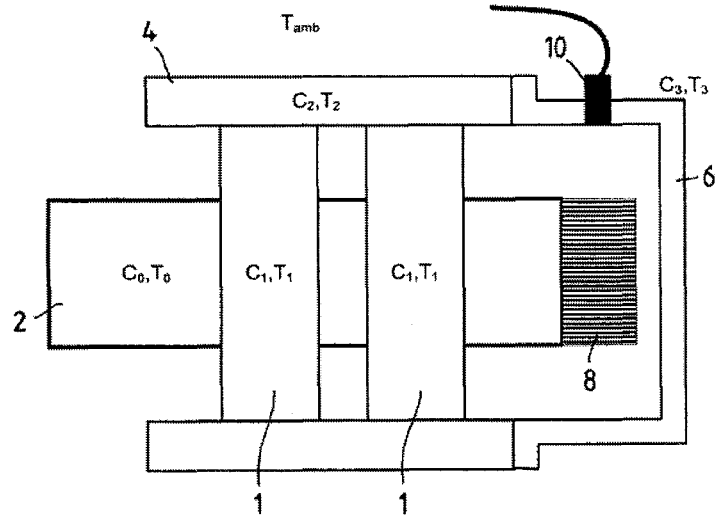
FIG. 1 shows a schematic illustration of a wheel set bearing of a rail vehicle with a temperature sensor.

The method according to the disclosed embodiments provides that the calculation model is designed to estimate the temperature of the particular wheel set bearing as a function of the speed and the ambient temperature of the rail vehicle as input variables of the calculation model or at a characteristic location of the particular wheel set bearing. In addition, the temperature of a component of the wheel set, which is different from the wheel set bearing but is directly or indirectly connected to the wheel set bearing in a thermally conductive manner, is measured during operation as a measured temperature by means of at least one temperature sensor. The temperature of the component which is different from the wheel set bearing is estimated using the calculation model as an estimated temperature. The calculation model has a correction element to improve the accuracy of the calculation model with respect to the estimation of the temperature of the wheel set bearing. The correction element enables the calculation model to be continuously, temporarily or cyclically calibrated or adjusted based on a comparison of the measured temperature with the estimated temperature.

In other words, automatic calibration or automatic adjustment of the calculation model is carried out by measuring and estimating the temperature at a location which is different from the particular wheel set bearing and at which the circumstances for the mounting of a temperature sensor and the cabling thereof are more favorable than at the particular wheel set bearing.

In addition to the speed and the ambient temperature of the rail vehicle, further input variables can also be used for the calculation model. The calculation model must then allow the temperature of the bearings to be determined from the temperature at the measurement point i.e. at the component which is different from the wheel set bearing or at the assembly which is different from the wheel set bearing. The calculation model is based on the ideal that the input of heat at the wheel set bearing by conduction of heat is transmitted to the measurement point by conduction of heat and transfer of heat and, furthermore, influenced by external factors such as, for example, the cooling of the components of the wheel set by the dynamic wind owing to the speed of the rail vehicle or the heating of the components by a high ambient temperature. If simply a lower value would be selected for the diagnostic threshold due to the measurement location without the method presented here, incorrect triggering with corresponding faults would have to be expected.

Input variables of the calculation model are, as well as the temperature at the measurement point, the speed and the external temperature. As a result, the method supplies an estimated wheel set bearing inner temperature or the temperature of the wheel set bearing at a characteristic location such as the load zone. The calculation model takes into account thermal peripheral conditions such as, for example: input of heat through bearing friction; conduction of heat within the wheel set; free convection; and forced convection.

The correction element K or the correction term thereof may be adapted continuously or cyclically based on a comparison of the measured temperature with the estimated temperature at the measurement point. As a result of the influence of the correction element, the accuracy of the calculation model increases with the operating period. Initial errors in the original model formation, inaccuracies and deviations from the real behavior, such as occur as a result of typical disruptive influences in a rail vehicle, are largely compensated by the correction element.

The estimation of temperature can then be used to detect bearings which have run hot (hot running detection) by comparing the estimated temperature value with a temperature limiting value and generating a signal for a wheel set bearing which has run hot if the temperature limiting value is exceeded by the estimated temperature value, and generating a signal for thermally undisturbed operation of the particular wheel set bearing if the temperature limiting value is undershot by the estimated temperature value.

Additionally, or alternatively, the temperature of the wheel set bearing of the wheel set of the rail vehicle which is estimated by the method according to the disclosed embodiments is used for a comparison with a temperature limiting value to be able to assess whether a brake device, in particular a friction brake, which is assigned or adjacent to the wheel set bearing is in a released or applied state.

In particular, an estimated temperature of the wheel set bearing which exceeds the temperature limiting value then supplies a signal for an applied state of the friction brake which is assigned or adjacent to the wheel set bearing and an estimated temperature of the wheel set bearing which undershoots the temperature limiting value supplies a signal for a released state of the friction brake which is assigned or adjacent to the wheel set bearing.

This is based on the experience that when a friction brake, such as for example the disk brake which is assigned to one of the axles of the wheel set bearing, is applied, friction heat is produced. This friction heat is then transmitted to the adjacent wheel set bearing through transfer of heat, conduction of heat along the axle and/or convection.

A relatively low wheel set bearing temperature then indicates not only normal running of the wheel set bearing but also a released state of the adjacent friction brake. In contrast, a relatively high wheel set bearing temperature supplies an indication of a wheel set bearing which has run hot and/or an applied state of the friction brake which is adjacent to the particular wheel set bearing.

With the wheel set bearing temperature which is estimated based on the method according to the disclosed embodiments, it is therefore possible not only to monitor wheel set bearings of axles of rail vehicles with respect to their thermal state but also the functions (applied or released) of friction brakes of the rail vehicle which are adjacent to the wheel set bearing.

As a result of the measures specified, advantageous developments and improvements of the disclosed embodiments are possible.

The method described above may be further developed by virtue of the fact that it is suitable for estimating the temperatures of a plurality of wheel set bearings of wheel sets of a rail vehicle and contains the following operations:

at least some of the wheel set bearings are respectively assigned a calculation model, to estimate in each case a value for the ambient temperature of the rail vehicle as a function of the speed of the rail vehicle as an input variable of the respective calculation model, wherein a correction element is provided to improve the accuracy of the calculation models assigned to at least some of the wheel set bearings in relation to the respective estimation of the value for the ambient temperature of the rail vehicle for each of the calculation models, with which correction element the particular calculation model is continuously, temporarily or cyclically calibrated based on a comparison of the respective estimated temperature with the respective measured temperature of the respective component which is respectively different from the particular wheel set bearing, and in that a resulting ambient temperature is formed from the values for the ambient temperature, which are estimated based on the calculation models assigned to at least some of the wheel set bearings, which ambient temperature is respectively used as an input variable for the calculation models which are used for estimating the value of the respective temperature of the respective wheel set bearing.

The calculation model for estimating the ambient temperature can be applied, in particular, when a plurality of wheel set bearings have to be monitored. To be precise, in rail vehicles with monitoring of bearings it is necessary to monitor all the wheel set bearings. A plurality of measuring points are also present at the components which are different from the wheel set bearings, for example eight per car and four per bogie, which comprises two wheel sets, composed respectively of two wheels and one axle. When there are a plurality of such measuring points, it is advantageous that the estimation of the ambient temperature remains uninfluenced by an individual instance or a small number of instances of hot running at the wheel set bearings. Likewise, the sensitivity with respect to interference such as, for example, solar radiation, is lower.

Because the ambient temperature is no longer measured as an input variable of the calculation model for the estimation of the wheel bearing temperature by means of a separate temperature sensor but is instead also estimated by a calculation model, it is possible to dispense with such a temperature sensor. The calculation model is then designed in such a way that it can estimate an ambient temperature which is present so that, in the case of an intact wheel set bearing, the temperature which continues to be measured occurs at the respective component which is respectively different from the particular wheel set bearing.

However, if a wheel set bearing is defective and has, for example, run hot, the relatively high temperature of the wheel set bearing which is then included in the calculation model would falsify the estimation result for the ambient temperature. To prevent such falsification, a resulting ambient temperature is formed from the values for the ambient temperature which are estimated based on the calculation models assigned to at least some of the wheel set bearings, with the result that falsifications due to wheel set bearings which have run hot under certain circumstances are reduced or do not occur at all.

So that an instance of hot running at one of the wheel set bearings does not lead to a high ambient temperature being estimated by the calculation model but rather to a correspondingly high wheel set bearing temperature, a resulting value is formed from the individual estimations of the ambient temperature.

This may be implemented, for example, by virtue of the fact that only the n lowest estimated ambient temperatures are used, for example, as a mean value of the n lowest estimated ambient temperatures. The resulting value of the ambient temperature is then used as a uniform input variable for the calculation models for the estimation of the temperatures of the individual wheel set bearings.

The method is then correspondingly precise and less susceptible to disruptive influences. This is important, because, in addition to the safety of the method, incorrect triggering should also be avoided.

As already indicated above, the calculation model for estimating the temperature of the wheel set bearing and/or the calculation model for estimating the ambient temperature of the rail vehicle is based on modeling of at least some of the following elements: thermal capacities of components of the wheel set or of the wheel set bearing, conduction of heat in components of the wheel set or of the wheel set bearing, heat transfer resistances between components of the wheel set or of the wheel set bearing, and forced transfer of heat, brought about by forced and free convection, between components of the wheel set or of the wheel set bearing and the surroundings.

Furthermore, basic calibration or basic parameterization is respectively carried out in the calculation model for estimating the temperature of the wheel set bearing and/or in the calculation model for estimating the ambient temperature of the rail vehicle, based on which basic calibration the correction elements or correction terms are adapted to improve the accuracy of the calculation models during operation of the rail vehicle. In other words, an initial calibration or basic calibration of the calculation models can be derived from the vehicle parameters, determined using simulations (for example finite elements) or carried out based on measured data.

The disclosed embodiments also relate to a device for carrying out the method described above, wherein a temperature sensor is provided for measuring the temperature of the component of the wheel set which is different from the wheel set bearing but which is directly or indirectly connected to the wheel set bearing in a thermally conductive manner, and a microcomputer is provided in which the calculation model for estimating the temperature of the wheel set bearing and/or the calculation model for estimating the ambient temperature of the rail vehicle are/is implemented.

In this context, the temperature sensor may be combined with a speed sensor of an anti-skid device of the rail vehicle to form a combination sensor. There is then no additional expenditure for the temperature sensor as a result of the sensor installation and cabling.

Furthermore, the component of the wheel set which is different from the wheel set bearing is, for example, a wheel set bearing cover which at least partially covers the wheel set bearing.

FIG. 1 shows a schematic illustration of a wheel set bearing 1 of a rail vehicle, wherein two wheels (not shown explicitly here) are arranged at the ends of a shaft or axle 2 of the wheel set. In this context, a wheel set bearing 1, which supports the axle 2 on a bogie (likewise not shown here) is present in the vicinity of each of the wheels. The wheel set bearing 1 may be a double bearing, i.e. two wheel set bearings which are arranged one behind the other in the axial direction are present, for example in the form of two roller bearings.

The following embodiments relate to a method and to a device for estimating the temperature of the wheel set bearing 1 by means of a calculation model. The calculation model for estimating the temperature of the wheel set bearing 1 is based on modeling of the thermal capacities of components of the wheel set or of the wheel set bearing 1, the conduction of heat in components of the wheel set or of the wheel set bearing 1, the heat transfer resistances between components of the wheel set or of the wheel set bearing 1 and the forced convection brought about by the speed of the rail vehicle, the free convection and the transfer of heat between the components of the wheel set or of the wheel set bearing 1 into the surroundings. The forced convection is a function of the speed of the rail vehicle.

Figure 2:
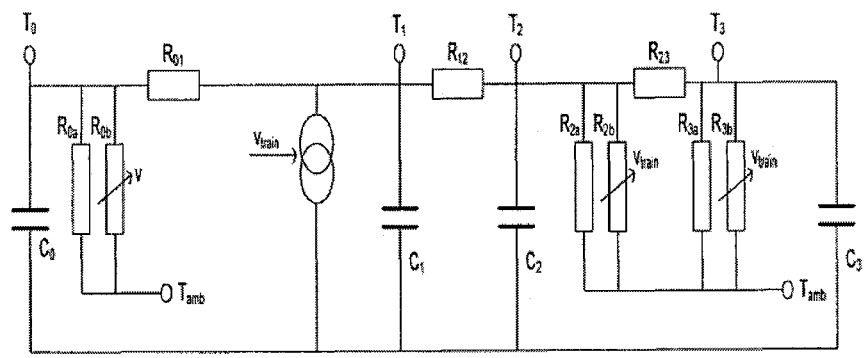
FIG. 2 shows a schematic equivalent circuit diagram of a calculation model within the scope of a method for estimating the wheel set bearing temperature of the wheel set bearing from FIG. 1 or the ambient temperature of the rail vehicle.

An electrical equivalent circuit diagram of the calculation model is shown in FIG. 2 and has the following elements:

the axle 2 has a thermal capacity $C_o$, wherein conduction of heat, symbolized by the resistance $R_{01}$, takes place from the axle to the wheel set bearing 1 with the thermal capacity $C_1$, and vice versa. This is because inner rings of the wheel set bearings 1 which may be embodied as roller bearings are directly connected to the axle 2 in a thermally conductive fashion. To simplify, both wheel set bearings 1 which are combined to form a double bearing have the thermal capacity C1. Furthermore, the free and forced convection, i.e. the transfer of heat from the axle 2 to the surroundings is symbolized by the resistances $R_{0a}$ and $R_{0b}$. The forced convection takes place owing to the speed $v_{train}$ of the rail vehicle. It is assumed that the axle 2 has a temperature $T_0$.

Heat is conducted from the wheel set bearings 1 with the thermal capacity C1 to a common housing 4 of the wheel set bearings 1, which housing 4 has the thermal capacity $C_2$, and to the axle 2 with the thermal capacity $C_0$ via the resistance $R_{01}$. Furthermore, an input of heat which is dependent on the speed $v_{train}$ of the rail vehicle occurs into the wheel set bearing 1. It is assumed that the wheel set bearings 1 have a temperature $T_1$.

The conduction of heat from the housing 4 of the wheel set bearings 1 with the thermal capacity $C_2$ to the wheel set bearings 1 ($C_1$) is symbolized by the resistance $R_{12}$, and the conduction of heat to a wheel set bearing cover 6 with the thermal capacity $C_3$ is symbolized by the resistance $R_{23}$. The resistances $R_{2a}$ and $R_{2b}$ characterize the free convection and the forced convection and therefore the transfer of heat from the housing 4 into the surroundings, and vice versa. It is assumed that the housing 4 is at the temperature $T_2$.

The free convection and the forced convection which act at the wheel set bearing cover 6, and therefore the transfer of heat from the latter into the surroundings, is symbolized by the resistances $R_{3a}$ and $R_{3b}$.

The housing 4 is directly connected here in a thermally conductive fashion to the outer bearing rings of the wheel set bearings 1 which may be embodied as roller bearings, and also at the end to the wheel set bearing cover 6. The conduction of heat between the housing 4 and the wheel set bearing cover 6 takes place via the resistance $R_{23}$. The transfer of heat between the surroundings with the ambient temperature $T_{amb}$ and the wheel set bearing cover 6 by free convection and forced convection owing to the speed $v_{train}$ is characterized by the heat transfer resistances $R_{3a}$ and $R_{3b}$).

The wheel set bearing cover 6 encloses the end of the axle 2, which projects axially a certain amount beyond the wheel set bearings 1, and on which a pole wheel 8 of a speed sensor (otherwise not shown here) is formed. The speed sensor sends a speed signal to an anti-skid device of the rail vehicle to be able to carry out slip-regulated braking operations.

Instead of measuring the temperature $T_1$ of the wheel set bearing 1 directly, the temperature $T_3$ of the wheel set bearing cover 6 is measured by means of a temperature sensor 10. Furthermore, a sensor (not shown here) is also provided for directly or indirectly measuring the speed $v_{train}$ of the rail vehicle and first a sensor (not shown here) for measuring the ambient temperature $T_{amb}$ is also provided.

Figure 3:
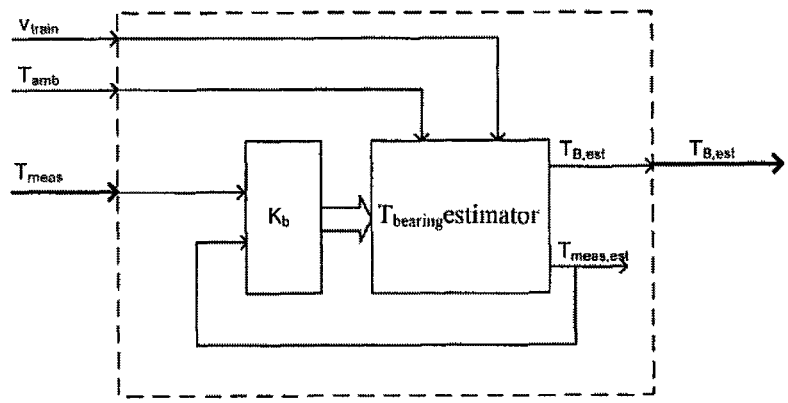
FIG. 3 shows a block circuit diagram illustrating a method for estimating the wheel set bearing temperature of the wheel set bearing from FIG. 1.

In the disclosed embodiment of the calculation model $T_{bearing}$estimator shown as a block circuit diagram in FIG. 3, the temperature $T_3$ of the wheel set bearing cover 6 which is measured by the temperature sensor 8 is defined as $T_{meas}$. Furthermore, in FIG. 3 the temperature $T_1$ of the wheel set bearings 1 which is to be estimated by the calculation model $T_{bearing}$,estimator is denoted by $T_{B,est}$. On the other hand, the designation of the ambient temperature $T_{amb}$ and that of the speed $v_{train}$ of the rail vehicle remain unchanged.

The calculation model $T_{bearing}$,estimator is then capable, owing to its design illustrated in FIG. 2, of estimating the temperature $T_{B,est}$ of the wheel set bearings 1 as a function of the speed $v_{train}$ and of the ambient temperature $T_{amb}$ of the rail vehicle as input variables.

In addition, the temperature $T_{meas}$ of the wheel set bearing cover 6, which is connected in a thermally conductive manner to the housing 4 and to the wheel set bearings 1, is measured by the temperature sensor 10 during operation as a measured temperature. Parallel to this, the temperature of the wheel set bearing cover 6 is also estimated as an estimated temperature $T_{meas,est}$ using the calculation model $T_{bearing}$,estimator.

To improve the accuracy of the calculation model $T_{bearing}$, estimator with respect to the estimation of the temperature $T_{B,est}$ of the wheel set bearings 1, the calculation model $T_{bearing}$,estimator has a correction element $K_b$ with which the calculation model is continuously, temporarily or cyclically calibrated or adjusted based on a comparison of the measured temperature $T_{meas}$ of the wheel set bearing cover 6 with the estimated temperature $T_{meas,est}$ of the wheel set bearing cover 6.

In other words, automatic calibration or automatic adjustment of the calculation model $T_{bearing}$,estimator takes place, the latter having the objective of estimating the temperature $T_{B,est}$ of the wheel set bearings 1 by measuring and estimating the temperature at a location of the wheel set which is different from the wheel set bearings 1 but which is thermodynamically connected to the wheel set bearings 1 by the conduction of heat or the transfer of heat. This location may be the wheel set bearing cover 6 because, for reasons of space, on the one hand a temperature sensor 10 can be mounted more easily thereon than on the wheel set bearings 1 themselves. On the other hand, the speed sensor which interacts with the pole wheel 8 and is provided for anti-skid protection is arranged on the wheel set bearing cover 6, with the result that the temperature sensor 10 can be advantageously combined with the speed sensor to form a combination sensor 10.

Furthermore, in the calculation model $T_{bearing}$,estimator, basic calibration or basic parameterization is carried out and is used as a basis for adapting the correction element $K_b$ or the correction term $K_b$ to improve the accuracy of the calculation model $T_{bearing}$,estimator during operation of the rail vehicle. The initial calibration or basic calibration of the calculation model $T_{bearing}$,estimator is derived, for example, from the vehicle parameters and is determined using simulations (for example finite elements) or can be carried out based on measured data.

Figure 4:
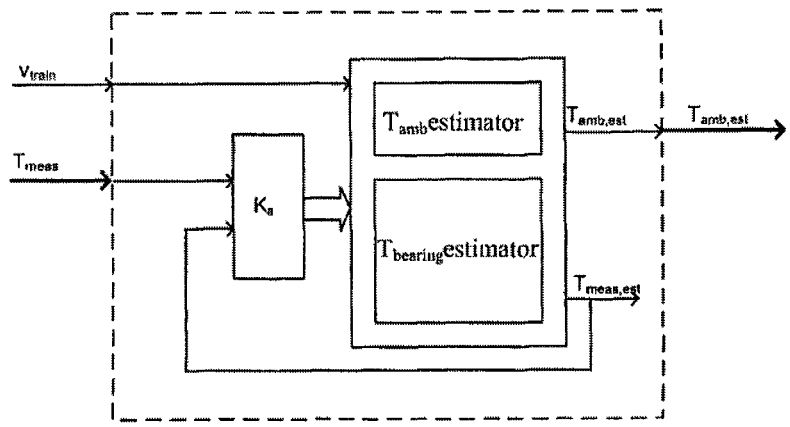
FIG. 4 shows a block circuit diagram illustrating a method for estimating the ambient temperature of the rail vehicle.

The method described above may be further developed by virtue of the fact that it is suitable for estimating the temperatures of a plurality of wheel set bearings 1 of wheel sets of the rail vehicle. For this purpose, at least some of the wheel set bearings 1, and may be all of the wheel set bearings 1, of the rail vehicle may be respectively assigned a calculation model $T_{amb}$estimator, to estimate in each case a value $T_{amb,est}$ for the ambient temperature of the rail vehicle as a function of the speed $v_{train}$ of the rail vehicle as an input variable of the respective calculation model $t_{amb}$estimator. Such a calculation model $T_{amb}$estimator is shown as a block circuit diagram in FIG. 4 and combined, for example, with the calculation model $T_{bearing}$estimator which is assigned to the respective wheel set bearing 1.

A correction element $K_a$ is provided to improve the accuracy of the calculation models $T_{amb}$estimator in relation to the respective estimation of the value $T_{amb}$ for the ambient temperature of the rail vehicle for each of the calculation models $T_{amb}$estimator, with which correction element $K_a$ the particular calculation model $T_{amb}$estimator is continuously, temporarily or cyclically calibrated or adjusted based on a comparison of the respective estimated temperature $T_{meas,est}$ with the respective measured temperature $T_{meas}$ of the respective wheel set bearing cover 6 of the particular wheel set bearing 1. The dynamic adjustment of the calculation models $T_{amb}$estimator for estimating the ambient temperature $T_{amb}$ is therefore carried out as in the calculation model $T_{bearing}$estimator shown in FIG. 3.

Such a calculation model $T_{amb}$estimator, which has the structure shown in FIG. 2, is then designed in such a way that it can estimate an ambient temperature $T_{amb}$ which is present so that, in the case of an intact wheel set bearing 1, the temperature $T_{meas}$ which continues to be measured occurs at the wheel set bearing cover 6. However, if one or more wheel set bearings 1 is/are deflective and has/have for example, run hot, the relatively high temperatures of the particular wheel set bearings 1 which are then likewise included in the calculation model $T_{amb}$estimator would then falsify the estimation result for the ambient temperature $T_{amb}$.

Figure 5:
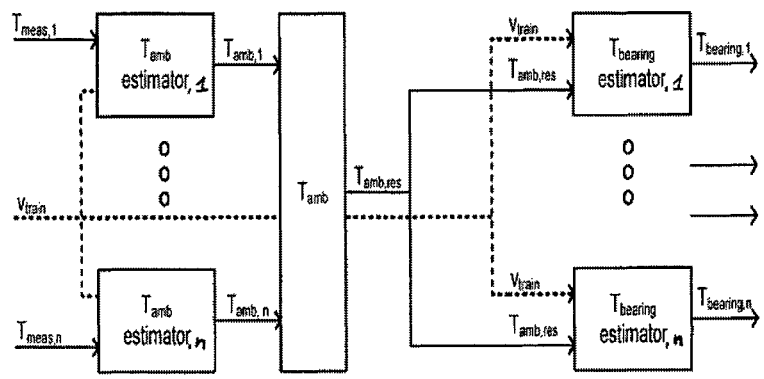
FIG. 5 shows a block circuit diagram illustrating a combined method for estimating wheel set bearing temperatures of wheel set bearings of a rail vehicle and for estimating the ambient temperature of the rail vehicle.

To prevent this, a resulting ambient temperature $T_{amb,res}$, which is respectively used as an input variable for the calculation models $T_{bearing}$estimator, $T_{bearing}$estimator,$_n$ and which serve to estimate the value $T_{B,est,1} \ldots T_{B,est,n}$ of the respective temperature of the respective wheel set bearing 1 may be formed, as illustrated in FIG. 5, from the values $T_{amb,1} \ldots T_{amb,n}$ for the ambient temperature which are estimated based on the calculation models $T_{amb}$estimator,$_1 \ldots T_{amb}$estimator,$_n$ assigned to the wheel set bearings 1 ... n. As a result, falsifications of the estimation result for the ambient temperature $T_{amb}$ as a result of wheel set bearings 1 which have run hot can be averaged out. So that an instance of hot running at one of the wheel set bearings 1 therefore does not lead to an estimation of a high ambient temperature by the particular calculation model $T_{amb}$estimator, but rather to a corresponding high wheel set bearing temperature $T_{b,est}$, a resulting value is formed from the individual estimations for the ambient temperature $T_{amb}$.

This may be implemented, for example, by virtue of the fact that only the n lowest estimated ambient temperatures $T_{amb}$ are used, for example as a mean value for the n lowest estimated ambient temperatures $T_{amb}$. The resulting value of the ambient temperature $T_{amb,res}$ is then used as a uniform input variable for the calculation models $T_{amb}$estimator$_1$ to $T_{amb}$estimator$_n$ for estimating the temperatures $T_{bearing,1}$ to $T_{bearing,n}$ of the particular wheel set bearings 1.

Figure 6:
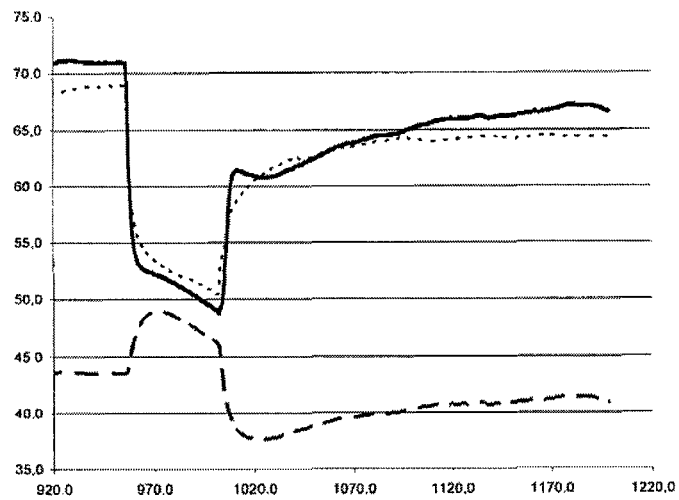
FIG. 6 shows a diagram illustrating temperature profiles on a test bench.

FIG. 6 is a temperature/time diagram resulting from a trial on a wheel set bearing test bench on which the calculation model $T_{bearing}$estimator from FIG. 2 and FIG. 3 was tested. However, only for the purposes of the wheel set bearing test bench, a temperature sensor which was arranged directly on the load zone of the wheel set bearings 1 and with which the temperature prevailing there was measured directly as $T_{B,meas}$ over time, was used for this. The profile of the temperature measured directly at the wheel set bearing 1 is shown in FIG. 6 as a dotted line ( ... ). The profile of the temperature $T_{B,est}$ which is estimated by means of the calculation model $T_{bearing}$estimator in FIG. 2 and FIG. 3 is shown as a continuous line (-), and the temperature $T_{meas}$ which is measured at the wheel set bearing cover 6 is shown as a dashed line (- - -). The ambient temperature $T_{amb}$ which is also may be measured here and a speed $v_{train}$ of the rail vehicle, simulated by means of fans, were also input into the calculation model $T_{bearing}$estimator. The comparison between the temperature $T_{B,est}$ (continuous line) estimated by means of the calculation model $T_{bearing}$estimator and the measured temperature $T_{B,meas}$ (dotted line) exhibits good correspondence and only small deviations.

The estimation of the temperature is then used to detect bearings which have run hot (hot running detection) by virtue of the fact that, for example, the estimated temperature value $T_{B,est}$ is compared with a temperature limiting value, and a signal for a wheel set bearing 1 which has run hot is generated when the temperature limiting value is exceeded by the estimated temperature value $T_{B,est}$, and a signal for a thermally undisrupted operation of the particular wheel set bearing 1 is generated when the temperature limiting value is undershot by the estimated temperature value $T_{B,est}$.

Additionally or alternatively, the temperature $T_{B,est}$ of the wheel set bearing 1 which is estimated by the method of the disclosed embodiments is used for comparison with a temperature limiting value to be able to assess whether a brake device (not shown here), in particular a disk brake which is assigned or adjacent to the wheel set bearing 1 is in a released or applied state.

An estimated temperature $T_{B,est}$ of the wheel set bearing 1 which exceeds the temperature limiting value then supplies a signal for an applied state of the friction brake which is assigned or adjacent to the wheel set bearing 1 and an estimated temperature $T_{B,est}$ of the wheel set bearing which undershoots the temperature limiting value supplies a signal for a released state of the friction brake which is assigned or adjacent to the wheel set bearing 1.

The experience shows that when a friction brake is applied, friction heat is produced. This friction heat is then transmitted to the adjacent wheel set bearing 1 by transfer of heat, conduction of heat along the axle 2 and/or convection.

A relatively low estimated wheel set bearing temperature $T_{B,est}$ then indicates not only normal running of the wheel set bearing 1 but also a released state of the adjacent friction brake. In contrast with this, a relatively high estimated wheel set bearing temperature $T_{B,est}$ supplies an indication of a wheel set bearing 1 which has run hot and/or of an applied state of the friction brake which is adjacent to the particular wheel set bearing 1.

The wheel set bearing temperature $T_{B,est}$ which has been estimated based on the method according to the disclosed embodiments also be used to monitor the functions (applied or released) of friction brakes of the rail vehicle which are adjacent to the wheel set bearing 1.

LIST OF REFERENCE NUMBERS

1 Wheel set bearing
2 Axle
4 Housing
6 Wheel set bearing cover
8 Pole wheel
10 Temperature sensor

The invention claimed is:

1. A method for estimating the temperature ($T_{B,est}$) of a wheel set bearing of a wheel set of a rail vehicle using a calculation model ($T_{bearing}$ estimator), the method comprising:

providing the calculation model ($T_{bearing}$,estimator) which is designed to estimate the temperature ($T_{B,est}$) of the particular wheel set bearing as a function of the speed ($v_{train}$) and the ambient temperature ($T_{amb}$) of the rail vehicle as input variables of the calculation model ($T_{bearing}$ estimator);

measuring, during operation, the temperature of a component of the wheel set as a measured temperature ($T_{meas}$), the component being different from the wheel set bearing but is directly or indirectly connected to the wheel set bearing in a thermally conductive manner;

estimating the temperature of the component using the calculation model ($T_{bearing}$ estimator) as an estimated temperature ($T_{meas,est}$);

continuously, temporarily or cyclically calibrating or adjusting the calculation model ($T_{bearing}$ estimator) using a correction element ($K_b$) to improve the accuracy of the calculation model ($T_{bearing}$ estimator) with respect to the estimation of the temperature ($T_{B,est}$) of the wheel set bearing, the correction element ($K_b$) being based on a comparison of the measured temperature ($T_{meas}$) with the estimated temperature ($T_{meas,est}$); and outputting the estimated temperature of a wheel set bearing of a wheel set so as to enable precise estimation of the temperature of the wheel set bearing with low signal-processing expenditure.

2. The method of claim 1, further comprising:

respectively assigning at least some of the wheel set bearings (1 . . . n) to a calculation model ($T_{amb}$estimator,$_1$ . . . $T_{amb}$estimator,$_n$) to estimate, in each case, a value ($T_{amb,1}$ . . . $T_{amb,n}$) for the ambient temperature of the rail vehicle as a function of the speed ($v_{train}$) of the rail vehicle, which is used as an input variable of the respective calculation model ($T_{amb}$estimator,$_1$ . . . $T_{amb}$estimator,$_n$);

providing a correction element ($K_{a,1}$ . . . $K_{a,n}$) to improve the accuracy of the calculation models ($T_{amb}$estimator,$_1$ . . . $T_{amb}$estimator,$_n$) assigned to at least some of the wheel set bearings (1 . . . n) in relation to the respective estimation of the value ($T_{amb,1}$ . . . $T_{amb,n}$) for the ambient temperature of the rail vehicle for each of the calculation models ($T_{amb}$estimator,$_1$ . . . $T_{amb}$estimator,$_n$), wherein the correction element ($K_{a,1}$ . . . $K_{a,n}$) is used to continuously, temporarily or cyclically calibrate the particular calculation model ($T_{amb}$estimator,$_1$ . . . $T_{amb}$estimator,$_n$) based on a comparison of the respective estimated temperature ($T_{meas,est,1}$ . . . $T_{meas,est,n}$) with the respective measured temperature ($T_{meas,est,1}$ . . . $T_{mes,n}$) of the component, wherein a resulting ambient temperature ($T_{amb,res}$) is formed from the values ($T_{amb,1}$ . . . $T_{amb,n}$) for the ambient temperature, which are estimated based on the calculation models ($T_{amb}$estimator,$_1$ . . . $T_{amb}$estimator,$_n$) assigned to at least some of the wheel set bearings (1 . . . n), wherein the ambient temperature ($T_{amb,res}$) is respectively used as an input variable for the calculation models ($T_{bearing}$,estimator,$_1$ . . . $T_{bearing}$,estimator,$_n$) used for estimating the value ($T_{B, est,1}$ . . . $T_{B, est,n}$) of the respective temperature of the respective wheel set bearing (1 . . . n).

3. The method of claim 2, wherein the resulting ambient temperature ($T_{amb,res}$) is calculated using mean values or medium values of the n lowest estimated ambient temperatures ($T_{amb}$) from the values ($T_{amb,1}$ . . . $T_{amb,n}$) for the ambient temperature estimated based on the calculation models ($T_{amb}$estimator,$_1$ . . . $T_{amb}$estimator,$_n$) assigned to at least some of the wheel set bearings (1 . . . n).

4. The method of claim 1, wherein the calculation model ($T_{bearing}$,estimator) for estimating the temperature of the wheel set bearing and/or the calculation model ($T_{amb}$estimator,$_1$ ... $T_{amb}$estimator,$_n$) for estimating the ambient temperature ($T_{amb}$) of the rail vehicle is based on modeling of at least one of the following: thermal capacities of components of the wheel set or of the wheel set bearing, conduction of heat in components of the wheel set or of the wheel set bearing, heat transfer resistances between components of the wheel set or of the wheel set bearing, and forced transfer of heat, brought about by forced and free convection, between components of the wheel set or of the wheel set bearing and the surroundings.

5. The method of claim 1, wherein basic calibration or basic parameterization is respectively carried out in the calculation model ($T_{bearing}$estimator) for estimating the temperature of the wheel set bearing and/or in the calculation model ($T_{amb}$estimator) for estimating the ambient temperature ($T_{amb}$) of the rail vehicle, wherein the correction elements ($K_a$, $K_b$) are adapted based on that basic calibration or basic parameterization to improve the accuracy of the calculation models ($T_{bearing}$estimator, $T_{amb}$estimator) during operation of the rail vehicle.

6. A device for estimating the temperature ($T_{B,est}$) of a wheel set bearing of a wheel set of a rail vehicle using a calculation model ($T_{bearing}$ estimator), wherein:
   the calculation model ($T_{bearing}$, estimator) is designed to estimate the temperature ($T_{B,est}$) of the particular wheel set bearing as a function of the speed ($v_{train}$) and the ambient temperature ($T_{amb}$) of the rail vehicle as input variables of the calculation model ($T_{bearing}$estimator);
   the temperature of a component of the wheel set as a measured temperature ($T_{meas}$) during operation, the component being different from the wheel set bearing but being directly or indirectly connected to the wheel set bearing in a thermally conductive manner;
   the temperature of the component is estimated using the calculation model ($T_{bearing}$estimator) as an estimated temperature ($T_{meas,est}$);
   the calculation model ($T_{bearing}$estimator) is continuously, temporarily or cyclically calibrated or adjusted using a correction element ($K_b$) to improve the accuracy of the calculation model ($T_{bearing}$ estimator) with respect to the estimation of the temperature ($T_{B,est}$) of the wheel set bearing, the correction element ($K_b$) being based on a comparison of the measured temperature ($T_{meas}$) with the estimated temperature ($T_{meas,est}$); and
   wherein a temperature sensor is provided for measuring the temperature of the component of the wheel set which is different from the wheel set bearing, and a microcomputer is provided in which the calculation model ($T_{bearing}$estimator) for estimating the temperature of the wheel set bearing and/or the calculation model ($T_{amb}$estimator) for estimating the ambient temperature ($T_{amb}$) of the rail vehicle are/is implemented,
   wherein the estimated temperature of a wheel set bearing of a wheel set is output so as to enable precise estimation of the temperature of the wheel set bearing with low signal-processing expenditure.

7. The device of claim 6, wherein the temperature sensor is combined with a speed sensor of an anti-skid device of the rail vehicle to form a combination sensor.

8. The device of claim 7, wherein the component of the wheel set is a wheel set bearing cover which at least partially covers the wheel set bearing.

9. The device of claim 6, wherein the component of the wheel set is a wheel set bearing cover which at least partially covers the wheel set bearing.

10. A method of determining a brake state of a friction brake of a wheel set bearing of a wheel set of a rail vehicle, the method comprising:
   providing a calculation model ($T_{bearing}$, estimator) which is designed to estimate the temperature ($T_{B,est}$) of the particular wheel set bearing as a function of the speed ($v_{train}$) and the ambient temperature ($T_{amb}$) of the rail vehicle as input variables of the calculation model ($T_{bearing}$estimator);
   measuring, during operation, the temperature of a component of the wheel set as a measured temperature ($T_{meas}$), the component being different from the wheel set bearing but is directly or indirectly connected to the wheel set bearing in a thermally conductive manner;
   estimating the temperature of the component using the calculation model ($T_{bearing}$estimator) as an estimated temperature ($T_{meas,est}$);
   continuously, temporarily or cyclically calibrating or adjusting the calculation model ($T_{bearing}$estimator) using a correction element ($K_b$) to improve the accuracy of the calculation model ($T_{bearing}$ estimator) with respect to the estimation of the temperature ($T_{B,est}$) of the wheel set bearing, the correction element ($K_b$) being based on a comparison of the measured temperature ($T_{meas}$) with the estimated temperature ($T_{meas,est}$); and
   comparing the estimated temperature ($T_{B,est}$) of the wheel set bearing with a temperature limiting value, wherein, when the temperature ($T_{B,\ est}$) of the wheel set bearing exceeds the temperature limiting value, a signal for an applied state of at least one friction brake that is assigned or adjacent to the wheel set bearing and a signal is supplied for a released state of the friction brake which is assigned or adjacent to the wheel set bearing
   wherein the estimated temperature of the wheel set bearing of the wheel set is output so as to enable precise estimation of the temperature of the wheel set bearing with low signal-processing expenditure.

11. A method of determining whether a wheel set bearing of the wheel set of a rail vehicle has run hot, the method comprising:
   providing a calculation model ($T_{bearing}$, estimator) which is designed to estimate the temperature ($T_{B,est}$) of the particular wheel set bearing as a function of the speed ($v_{train}$) and an ambient temperature ($T_{amb}$) of the rail vehicle as input variables of the calculation model ($T_{bearing}$estimator);
   measuring, during operation, the temperature of a component of the wheel set as a measured temperature ($T_{meas}$), the component being different from the wheel set bearing but is directly or indirectly connected to the wheel set bearing in a thermally conductive manner;
   estimating the temperature of the component using the calculation model ($T_{bearing}$estimator) as an estimated temperature ($T_{meas,est}$);
   continuously, temporarily or cyclically calibrating or adjusting the calculation model ($T_{bearing}$estimator) using a correction element ($K_b$) to improve the accuracy of the calculation model ($T_{bearing}$ estimator) with respect to the estimation of the temperature ($T_{B,est}$) of the wheel set bearing, the correction element ($K_b$) being based on a comparison of the measured temperature ($T_{meas}$) with the estimated temperature ($T_{meas,est}$); and comparing the estimated temperature ($T_{B,\ est}$) with a temperature limiting value, wherein:
- when the estimated temperature ($T_{B,est}$) of the wheel set bearing exceeds the temperature limiting value, a signal is supplied for a wheel set bearing which has run hot;
- when the estimated temperature ($T_{B,\ est}$) of the wheel set bearing undershoots the temperature limiting value, a signal is supplied for thermally undisturbed operation of the wheel set bearing, wherein the estimated temperature is output so as to enable precise estimation of the temperature of the wheel set bearing with low signal-processing expenditure.

\* \* \* \* \*